Dec. 2, 1969 R. G. McINTYRE ET AL 3,481,568
AIRCRAFT SEAT EJECTION SYSTEM
Filed Nov. 13, 1967
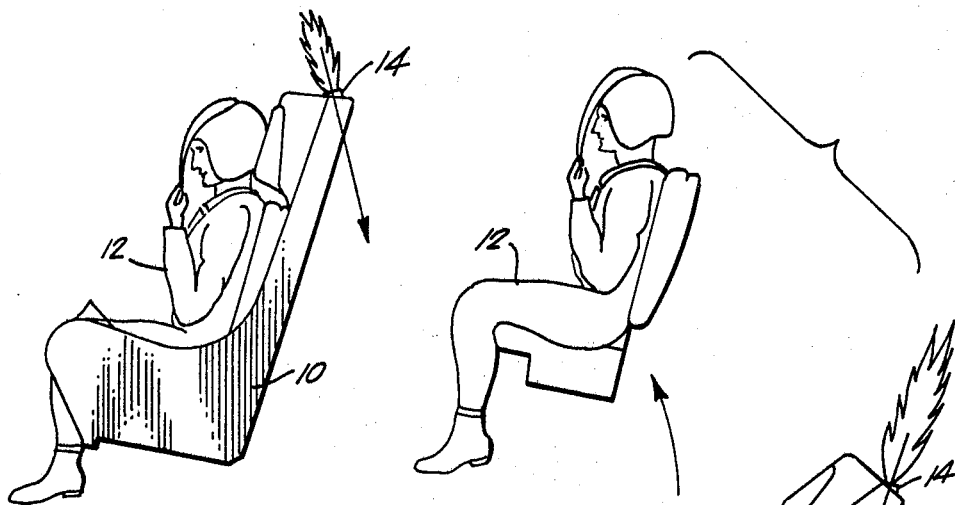
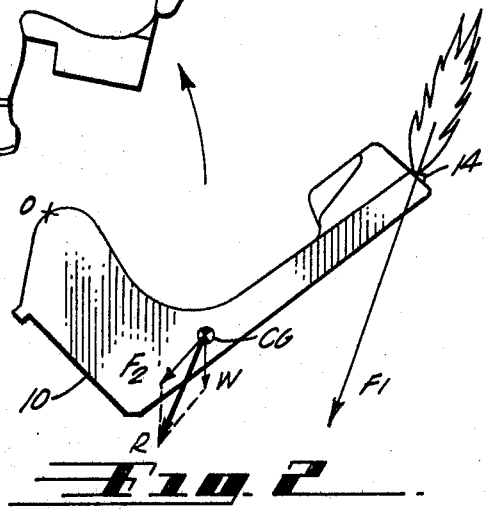
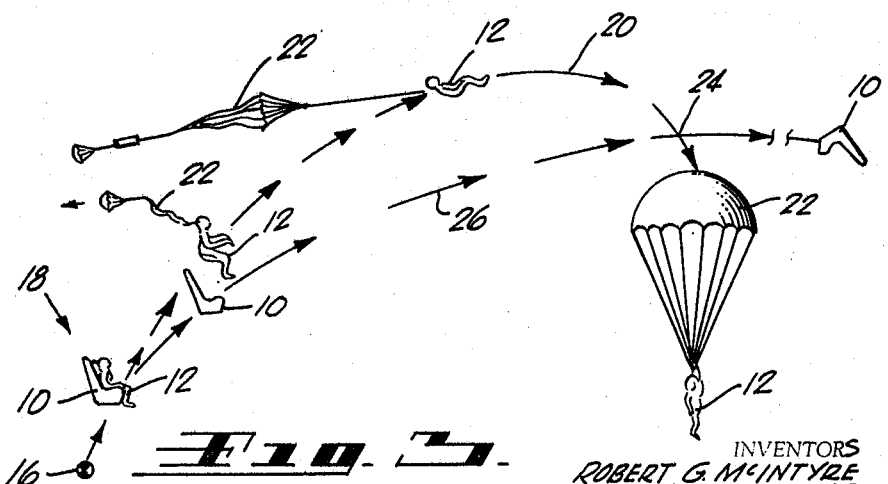
INVENTORS
ROBERT G. McINTYRE
DUDLEY A. RYER JR
MARTIN E. WILFERT
BY Jack C. Munro
—AGENT—

United States Patent Office 3,481,568
Patented Dec. 2, 1969

3,481,568
AIRCRAFT SEAT EJECTION SYSTEM
Robert G. McIntyre, Manhattan Beach, Dudley A. Ryer, Jr., Gardena, and Martin E. Wilfert, Seal Beach, Calif., assignors to McDonnell Douglas Corporation, a corporation of Maryland
Filed Nov. 13, 1967, Ser. No. 682,450
Int. Cl. B64d 25/04
U.S. Cl. 244—122                                    1 Claim

ABSTRACT OF THE DISCLOSURE

An aircraft seat ejection system which employs the use of a secondary thrust producing means which is activated subsequently to the seat ejecting rocket, the secondary rocket causing the seat to assume a different trajectory from the pilot.

BACKGROUND OF THE INVENTION

Much effort has been spent in establishing a safe ejectment procedure for aircraft crewmembers. The commonly employed procedure is to eject the crewmember and seat in an upward direction away from the aircraft and earth below with the seat and crewmember being maintained in their initial ejected position. The seat and crewmember are catapulted from the aircraft and then propelled upward by means of propelling rocket located on the lower pontior of the back of the seat. After burnout of the propelling rocket the seat and crewmember soon reach the apogee of the ejection trajectory. At this time the crewmember separates from the seat and thereafter assumes normal parachute descent to the earth.

One of the main problems accompanying the parachute descent of the crewmember is the possibility of collision with the seat structure itself before the crewmember has reached the ground. Since the seat and the crewmember both assume the same trajecetory and usually the crewmember is projected forward of the seat upon separation therefrom, once the crewmember operates his parachute and begins to slow down, there is a good possibility of the seat colliding with the crewmember or becoming entangled in the parachute lines.

Heretofore, many types of devices have been employed to cause the crewmember to separate from the seat structure. One of the reasons for the use of such a device is not that the seat might collide with the crewmember, but at high speeds, the crewmember is not able to remove himself from the seat which would hinder the opening of the crewmember's parachute. Common types of separating means are the use of a tightened strap so as to forcibly push the crewmember from the seat upon release of the seat harness. Another type of system uses an inflatable bladder located between the crewmember and the seat which upon release of the seat harness forces the crewmember and the seat apart. There are many other types of separating systems all of which employ the use of a force which reacts between the seat and the crewmember to separate the crewmember from the seat. However, with these types of systems both the seat and the crewmember have the same trajectory with usually the seat being separated a short distance to the rear of the crewmember. Since both the crewmember and the seat have the same trajectory, upon the deployment of the crewmember's parachute, it has been common for the seat to collide either with the crewmember or with the parachute or parachute lines. It has been found that the apparatus of the instant invention overcomes the seat-crewmember trajectory problem.

SUMMARY OF THE INVENTION

Basically, the device of this invention provides for the inclusion of a thrusting apparatus in combination with the ejection seat which causes a positive separation of the seat from the crewmember and assures the seat attains a trajectory divergent from the crewmember trajectory. More specifically, the thrust created induces rotation of the seat about a center of rotation located approximately at the crewmember's knee position. The center of gravity of the seat is located between this center of rotation and the thrust generating means so a linear movement is imparted to the seat which is almost perpendicular to the original seat trajectory. This causes the seat to assume a trajectory which is slightly lower than the crewmember's altitude in trajectory. Upon the crewmember's slowing in speed through the opening of the parachute the seat will pass by the crewmember at a lower altitude therefore precluding collision with the crewmember or its parachute system.

BRIEF DESCRIPTION OF THE DRAWINGS

FIGURE 1 is a pictoral view of an aircraft ejection seat of this invention showing the position of the seat just prior to separation from the crewmember, FIGURE 2 is a pictoral view similar to FIGURE 1 taken a minute increment of time later and showing the separation relationship between the crewmember and the seat, and FIGURE 3 is a diagrammatic view showing the divergent trajectory relationship between the seat and the crewmember upon being separated therefrom.

DESCRIPTION OF THE SHOWN EMBODIMENT

Referring particularly to FIGURE 1 there is shown an aircraft ejection seat 10 and a crewmember 12 seated therein. FIGURE 1 is to exemplify the arrangement between the crewmember and the seat after ejection from the aircraft. Usually such ejection seats include a delay actuation system which, after a short interval of time after the ejection of the seat and the crewmember from the aircraft, is activated and releases the crewmember's harness mechanism and permits separation of the crewmember from the seat. FIGURE 1 is a showing of the seat and crewmember at the time of the initiation of this delay actuation system.

In the delay actuation systems that have been used heretofore the crewmember is released from the seat and some form of physical apparatus such as a tightened strap or inflated bladder is activated so as to separate the seat from the crewmember. In the apparatus of this invention upon the initiation of the delay actuation system and the crewmember being released from the seat, a thrusting means 14 is actuated which reacts upon the ejection seat. The basic purpose of this thrusting means 14 is to impart to the ejection seat 10 a certain lineal velocity which causes the seat 10 to assume a trajectory different from that of the crewmember 12. For this purpose the particular location of the thrusting means is of utmost importance. To cause the seat to incur some lineal velocity in a direction different from the trajectory, the thrusting means must impart the force upon the center of gravity of the ejection seat. Also, maximum divergence is achieved when the thrust direction is substantially opposite to the direction of the crewmember's trajectory. To locate the thrust generating means at the seat center of gravity would position such at the lower back of the seat with the exhaust being pointed directly at the crewmember. As usually such an exhaust is extremely hot, such an arrangement would be impossible without the crewmember incurring injury.

However, it was discovered that if the thrust generating means was located at the top back of the seat a certain lineal velocity could be imparted to the seat as the center of rotation of the seat would be located at the crewmember's knee position. If the seat were merely positioned freely in space and such a thrust generating means activated, it is well known that the seat would merely rotate about its center of gravity with no lineal velocity being imparted thereto. However, in the instant of time required to separated the seat from the crewmember, the rotation is effected about point O of the seat which is the point of contact between the seat and the crewmember located at the crewmember's knee.

Noting FIGURE 2, $F_1$ represents the force emitted from the thrust generating means 14, which creates a certain momentum about point O. $F_2$ is the representative amount of force caused by $F_1$ which is transmitted through the center of gravity of the seat. Also acting upon the center of gravity is the constant force caused by gravity which is denoted W (the weight of the seat). Upon the taking of the resultant force R of $F_2$ and W the line of action of the lineal movement of the seat is obtained which causes the seat to assume a different trajectory than that of the crewmember.

In FIGURE 3 the divergent trajectories of both the crewmember 12 and the ejection seat 10 are shown in what is thought to be a reasonably accurate depiction. Both the ejection seat 10 and the crewmember 12 are ejected from the aircraft at location 16. At location 18 the delay actuation system is activated which permits the crewmember 12 to be separated from the seat 10 and thrust generating means 14 is initiated. Crewmember 12 continues on trajectory 20 and finally descends to earth by means of parachute system 22. The trajectory of seat 10 is denoted at 26 which is of a lesser altitude, due to the lineal velocity imparted to the seat through thrust generating means 14. Because seat 10 travels a shorter distance and because crewmember 12 is being slowed by means of the parachute system 22, seat 10 will pass point 24 prior to the passing of crewmember 12. As the speed of the crewmember 12 cannot be increased, it is considered impossible that the crewmember 12 and seat 10 should ever collide at the point of crossing 24.

It should be apparent from the foregoing description that certain modifications can be made without departing from the true scope and spirt of this invention. As for example, the particular placement of the thrust generating means 14 is to be considered as a matter of design. Also, the particular line of action of the thrust generating means can be readily varied. Although the thrust generating means 14 is shown as a rocket motor, other types of thrust means such as a container of compressed gas could be used. It is also to be considered within the contemplation of applicants' invention that more than one such thrust generating means could be readily employed. For example, two rockets, one on either side of the aircraft seat and in-line with the center of gravity of the seat. It has been found that a five-hundred pound thrust rocket firing for fifteen-hundredths of a second has been quite satisfactory. Such a rocket produces a linear velocity of 43 feet per second. Although this velocity is considered to be most satisfactory, it is to be understood that it can be varied by both the time of firing of the rocket or by variance of the rocket's thrust. It is only necessary that the seat assume a sufficiently divergent trajectory from the crewmember so as to preclude subsequent collision therebetween.

What is claimed is:

1. In combination with an aircraft ejection seat, a means for affecting separation of the seat from the occupant after the initial ejection and for establishing separate trajectories for the occupant and the seat, said means comprising:

a thrust generating means mounted adjacent the uppermost rear edge of the seat for imparting a rotational movement thereto, said thrust generating means inducing a rotational movement of the seat about a center of rotation, the seat having a center of mass disposed intermediate the center of rotation and said thrust generating means, said thrust generating means imparting a translational movement to the seat in a direction substantially perpendicular to the original seat trajectory thereby causing the seat to assume a new trajectory lower than that of the occupant.

References Cited

UNITED STATES PATENTS

| | | | |
|---|---|---|---|
| 3,352,518 | 11/1967 | Turner et al. | 244—122 |
| 3,356,320 | 12/1967 | Webb | 244—122 |
| 2,751,171 | 6/1956 | Martin | 244—141 |
| 3,270,991 | 9/1966 | Martin | 244—122 |
| 3,355,127 | 11/1967 | Stanley et al. | 244—122 |

MILTON BUCHLER, Primary Examiner

THOMAS W. BUCKMAN, Assistant Examiner